United States Patent [19]

Bauer et al.

[11] 4,190,225
[45] Feb. 26, 1980

[54] DEVICE FOR ADJUSTING VERTICAL AND INCLINED POSITIONS OF A VEHICLE SEAT

[75] Inventors: Heinz Bauer; Burckhard Becker; Alfred Gedig, all of Solingen, Fed. Rep. of Germany

[73] Assignee: C Rob Hammerstein GmbH, Solingen-Merscheid, Fed. Rep. of Germany

[21] Appl. No.: 20,632

[22] Filed: Mar. 14, 1979

[30] Foreign Application Priority Data

Mar. 17, 1978 [DE] Fed. Rep. of Germany ....... 2811582

[51] Int. Cl.² ...................... F16M 11/24; F16M 13/00
[52] U.S. Cl. .................................... 248/394; 248/396; 297/325
[58] Field of Search ............... 248/423, 419, 396, 394, 248/420, 429, 430, 371; 297/329, 316, 325, 346

[56] References Cited

U.S. PATENT DOCUMENTS

| 2,795,267 | 6/1957 | Williams | 248/394 |
|---|---|---|---|
| 2,905,228 | 9/1959 | Latimer | 248/393 |
| 3,055,627 | 9/1962 | Homier | 248/393 |
| 3,188,044 | 6/1965 | Epple | 248/394 X |
| 3,460,793 | 8/1969 | Posh | 248/394 |
| 3,525,496 | 8/1970 | Colautti | 248/394 |
| 3,552,707 | 1/1971 | Tanaka | 248/394 |
| 3,692,271 | 9/1972 | Homier et al. | 248/394 |
| 3,951,004 | 4/1976 | Heesch | 248/394 X |
| 4,010,927 | 3/1977 | Pickles | 248/429 X |

FOREIGN PATENT DOCUMENTS

| 618677 | 4/1961 | Canada | 248/393 |
|---|---|---|---|
| 957909 | 2/1950 | France | 248/430 |
| 2278526 | 7/1974 | France | 248/394 |

*Primary Examiner*—J. Franklin Foss
*Attorney, Agent, or Firm*—Michael J. Striker

[57] ABSTRACT

The vertical and angular position adjusting device includes at each lateral side of the seat a five-bar linkage including an underframe, a seat carrier bar, a pair of two-arm support levers pivotably connected to the frame, a coupling bar linked between the outer arm of one of the support levers and an end portion of the carrier bar, and the other end portion of the carrier bar being hinged to the outer arm of the other support lever. The support levers at one lateral side of the seat have gear segments formed on the inner arm of each support lever. A pair of arresting levers is linked to the underframe between the support levers and is provided with arresting teeth engageable with respective gear segments. A pair of switching levers is linked to the underframe between the arresting levers and is spring-biased to abut against a front locking surface provided on each arresting lever in order to hold the latter in a locking position. A control lever is linked to the underframe between the switching levers and supports a cam which displaces the switching levers against the force of the spring into a released position in which the selected arresting lever is disengaged from the support lever.

9 Claims, 2 Drawing Figures

DEVICE FOR ADJUSTING VERTICAL AND INCLINED POSITIONS OF A VEHICLE SEAT

BACKGROUND OF THE INVENTION

The present invention relates in general to a device for adjusting the vertical and inclined positions of a vehicle seat, and in particular, to a position adjuster including at each lateral side of the seat a five-bar linkage assembled of an underframe, a seat carrier bar, a pair of two-arm support levers hinged to the underframe, a coupling bar hinged between the outer arm of one of the support levers and an end portion of the carrier bar, and the other end portion of the carrier bar being hinged to the outer arm of the other support lever. The inner arms of the support levers are provided with gear segments cooperating, respectively, with arresting teeth controlled by a hand lever which is hinged to the underframe.

From the German publication 22 06 884 a device for adjusting the vertical and angular positions of a vehicle seat in which the gear segment of the support lever is directly hinged to the seat carrying bar and cooperates with a radially displaceable sliding member. The sliding member is provided with external arresting teeth engageable with the gear segment of the assigned support lever whereas the other support lever is linked to the coupling bar and cooperates with an opposite arresting gear arranged on a swivel arm. Both arresting teeth are actuated by means of cams which are linked to driving rods connected one to another by means of a tension spring. The free ends of the driving rods are provided with notches which are coupled to a control lever hinged to the underframe and being hand-operated by a handle.

The above-described prior art vertical and angular position adjusters for vehicle seats have the disadvantage that they are assembled of a relatively large number of individual component parts and consequently are expensive to manufacture and to assemble. Moreover, such rather complicated adjusters are prone to generate rattling noises and susceptible to malfunction of individual parts. Another disadvantage of such known device is in the fact that the path of movement of the control lever is relatively long and the locking engagement of the arresting teeth in their adjusted position is not always reliable.

SUMMARY OF THE INVENTION

It is, therefore, a general object of the present invention to overcome the aforementioned disadvantages.

More particularly, it is an object of this invention to provide an improved device for adjusting the vertical and angular position of vehicle seats of the aforedescribed type which is simple in structure and assembled of relatively few structural elements which can be easily manufactured and assembled.

Another object of this invention is to provide such a position adjusting device which in addition to low manufacturing and assembling costs is reliable, functionally advantageous and can be operated in a very simple manner.

An additional object of the invention is to provide such an adjusting device which occupies minimum space measured in a vertical plane at right angles to the direction of displacement of the seat.

In keeping with these objects, and others which will become apparent hereafter, one feature of the invention resides, in a vertical and angular position adjusting device of the aforedescribed type, in a combination which comprises a pair of arresting levers linked on the frame in operative proximity to the gear segments of the respective support levers; the side of the arresting levers facing the assigned gear segment being provided with arresting teeth and the other side of each arresting lever defining a locking surface and a releasing surface; a control mechanism including a pair of switching levers linked to the underframe between the arresting levers, biasing spring means connected to the switching lever for urging the same into a locking position in which they engage the locking surfaces of both arresting levers and thus bring the arresting teeth into engagement with respective gear segments, a control lever hinged to the underframe between the switching levers and supporting a cam for urging the switching levers against the force of the biasing spring to release the arresting lever and thus disengage the arresting teeth from the corresponding gear segment.

The adjusting mechanism in the device of this invention is assembled of relatively few structural elements which can be easily manufactured and assembled. The switching levers as well as the arresting levers are identical both at the front and at the rear of the seat. Also the supporting levers in the five-bar linkage can be made interchangeable. All these component parts can be mirror-symmetrically arranged relative to the control lever so that the assembly of the adjusting device of this invention is considerably simplified.

The five-bar linkage in the adjuster of this invention is held in its adjusted and locked position by engaging the teeth of arresting levers into corresponding gear segments of support levers and by urging switching fingers of the switching levers against locking surfaces formed as shoulders of a switching recess in the arresting levers. This locking position is automatically maintained by biasing springs. Due to the limited angular displacement of the switching levers, it is sufficient to employ a single biasing spring which holds both switching levers in their locking position. When one switching lever is axially displaced by means of a control hand lever, the contact pressure of the other switching lever against the corresponding arresting lever is increased so that the other switching arm and arresting lever remain stationary and act as a support for the biasing spring.

In the locking positions of the switching levers in which the switching fingers of the latter project against the locking surfaces of the arresting levers at a small angle, each arresting lever is subjected to the wedging action of the finger and is so tightly pressed against the gear segment of the support lever that no rattling noises can take place. The teeth of gear segments as well as the counteracting arresting teeth of the arresting levers are external teeth having a triangular shape so that they can always be brought into engagement from any angular position of the support levers.

The majority of component parts of the arresting device of this invention are flat pieces which can be conveniently manufactured by stamping so that the manufacturing cost of the device is very low. The assembled structure occupies minimum space in the direction at right angles to the longitudinal direction of displacement of the seat and also in the vertical plane so that the whole adjustable seat and support has a reduced height.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
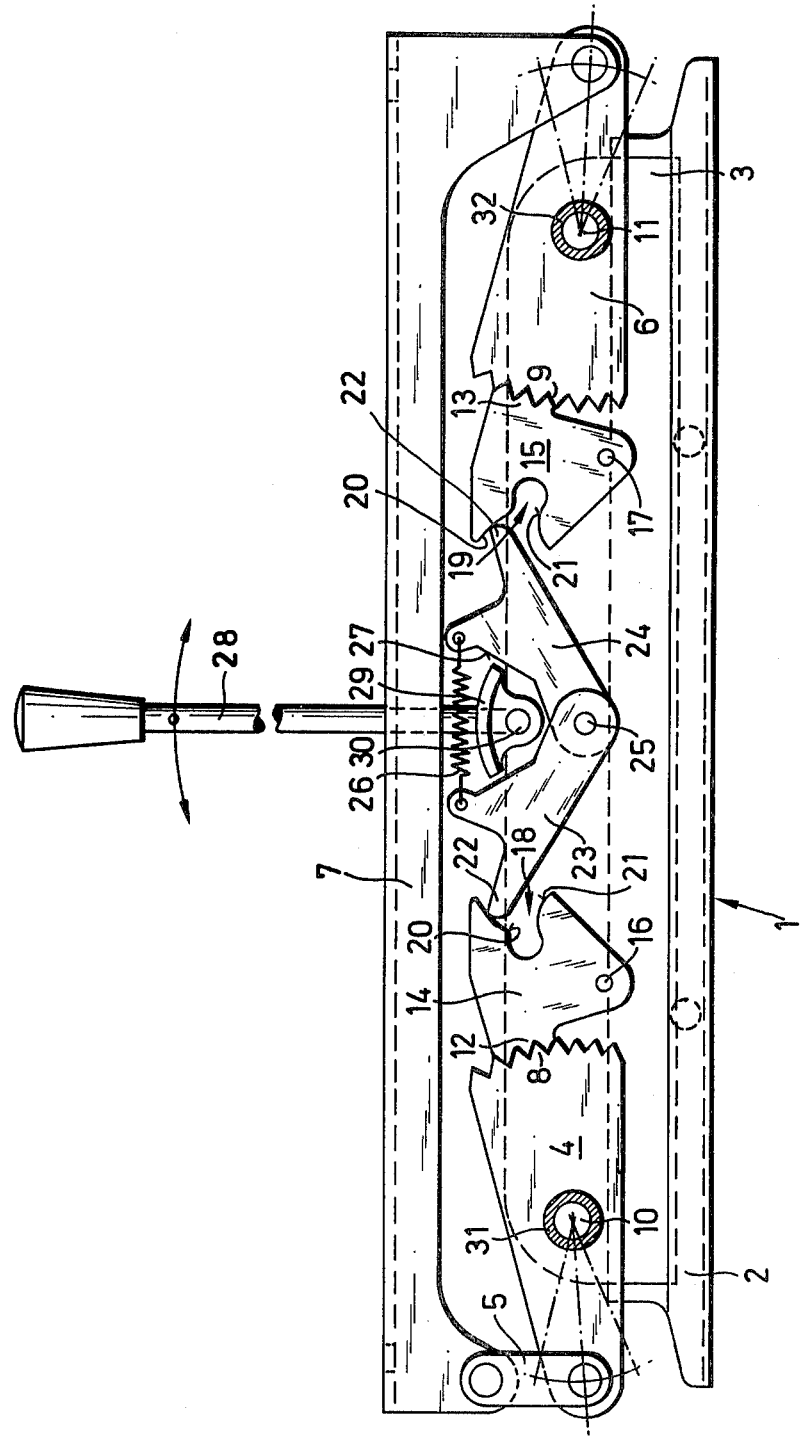
FIG. 1 is a side view of the device for adjusting the vertical and angular position of the vehicle seat.

The device of this invention as illustrated in FIG. 1 includes an underframe 1 which is assembled of two pairs of guide rails 2 and 3 arranged on both lateral sides of the seat. The arrangement of each interengaging pair of guide rails corresponds to the German Utility Model 7711097. Both rails 2 and 3 have a J-shaped cross-section, whereby the bottom rail 2 which is secured to the floor of the vehicle embraces and slidably supports the seat rail 3. The outer, vertically directed shoulder of seat rail 3 is extended upwardly and serves for supporting the bearings of individual component parts of the vertical and angular position adjuster.

This adjuster includes a pair of two-arm support levers 4 and 6 pivotably connected to respective end portions of the underframe 1. The outer arm of the rear support lever is directly linked to the end of a seat carrier bar 7, whereas the other end of the bar 7 is linked to the outer arm of the front support lever 4 by means of a coupling bar 5. In this manner, the underframe 1, support levers 4 and 6, seat carrier bar 7 and coupling bar 5 form together a five-bar linkage.

This five-bar linkage is secured in a predetermined vertical and angular position by arresting the pivotal movement of support levers 4 and 6 relative to underframe 1. For this purpose, gear segments 8 and 9 are formed on the inner arms of respective support levers 4 and 6. The gear segments 8 and 9 are provided with external triangular teeth. The pivot axles 10 and 11 of respective support levers 4 and 6 are situated approximately in the center of each lever. The levers 4 and 6 are manufactured from a flat sheet by stamping and both support levers 4 and 6 are identical and interchangeable. The triangular teeth of gear segments 8 and 9 are symmetrically arranged with respect to the center of the adjusting device. As it has been mentioned above, the outer arm of front support lever 4 is linked to the front end of seat carrier bar 7 by coupling bar 5.

Gear segments 8 and 9 are normally in mesh with arresting teeth 12 and 13 of arresting levers 14 and 15 which are supported for swinging movement about pivot axles 16 and 17. These axles 16 and 17 are situated under the connection line between the pivot axles 10 and 11 of levers 4 and 6. The serrated sides 12 and 13 of arresting levers 14 and 15 are formed with three arresting teeth corresponding in shape to the teeth of gear segments 8 and 9. The opposite sides of respective arresting levers 14 and 15 are provided with switching recesses 18 and 19 each defining an upper locking surface 20 and a lower releasing surface 21. The switching recesses 18 and 19 cooperate respectively with one-arm switching levers 23 and 24 supported on the underframe 1 for rotary movement about pivot axle 25. Each switching lever 23 and 24 has an obliquely upwardly projecting finger 22 normally directed against the locking surface 20 of arresting levers 14 and 15. The turning circle of the free end of each switching finger 22 forms with the locking surface 20 a very small angle so that even in the case of dimensional differences there is always attained a reliable contact pressure and, therefore, the gear segments 8 and 9 of support levers are kept in mesh with opposite arresting teeth 12 and 13 of the arresting levers without any rattling noises. The free ends of switching levers 23 and 24 are resiliently pulled toward each other by spring 26 which keeps switching fingers 22 in their locking position, that means against the arresting shoulder or surface 20.

The inner sides of switching levers 23 and 24 form cam follower surfaces 27 which cooperate with a cam 29 pivotably supported on underframe 1 and rigidly connected to hand lever 28. In the central or neutral position of the hand lever, the arms of cam 29 are clear of the cam follower surfaces 27. The pivot axle 30 of hand lever 28 is positioned above the axle 25 of switching levers 23 and 24 or, in a modification, can coincide with the latter.

The adjustment of the vertical and angular position of the vehicle seat with this type of the adjuster always results in combined adjusting movements which are carried out as follows: If the hand lever 28 is shifted to the left-hand position in the drawing, that means forwardly, cam 29 compresses via cam follower surface 27 the front switching lever 23 downwardly so that its switching finger 22 is disengaged from the arresting surface 28 of lever 14 and exerts pressure from above against the releasing shoulder or surface 21 of the switching recess 18. By continuing the forward rotation of hand lever 28 in the counterclockwise direction, the front arresting lever 14 is tilted in clockwise direction so that its arresting teeth 12 are disengaged from the gear segment 8 on the front support lever 4. As a result, the support lever 4 together with linked bars 5 and 7 are free to be adjusted into a different vertical and angular position. The hand-operated lever 28 acts against the biasing spring 26 and as soon as the hand lever 28 is released the spring accelerates the front switching lever 23 upwardly and urges the arresting finger 22 into its normal arresting position in contact with the locking surface 20 so that arresting lever 14 is rotated to the left into engagement with the teeth of gear segment 8.

The coupling bar 5 can also be arranged at the rear of the seat, whereas the front support lever 4 is directly linked to the seat carrying bar 7. Also the switching recess 18 can be provided on switching levers 23 and 24 whereas the switching finger 22 can be made on arresting levers 14 and 15. Such a kinematic inversion of the switching arrangement is made possible either on both switching levers 23 and 24 and the cooperating arresting levers 14 and 15 or on one of them only.

A complete vertical and angular position adjusting device of this invention includes two arrangements of FIG. 1 provided on both lateral sides of the vehicle seat. At one side, however, the parts serving for controlling the adjustment can be dispensed with, namely the hand-lever 28 with cam 29, the two arresting levers 14 and 15 and the two switching levers 23 and 24. In this case, the support levers 4 and 5 at both lateral sides of the seat are connected for joint rotation by transverse rods 31 and 32. The transverse rods are preferably in the form of tubes which are relatively lightweight and capable of transmitting high rotational moments, so that each pair of lower support levers 4 and rear support levers 6 are always synchronously rotated. The arresting levers, the switching levers, and the cam can also be provided at each side of the vehicle seat whereby the two cams are interconnected for joint rotation by means of a transverse connecting rod. This modification however is less advantageous with regard to cost and weight than the previously-described embodiment in which the switching and arresting levers are provided at one lateral side of the seat only.

Figure 2:
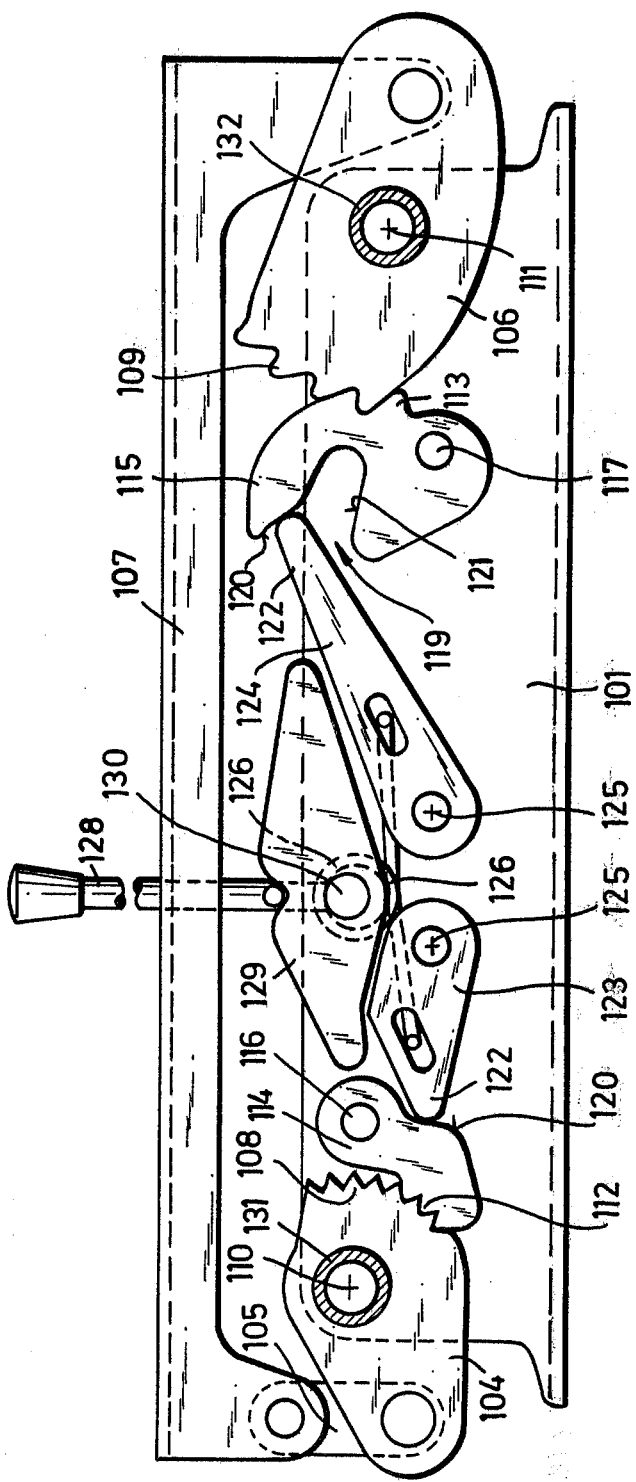
FIG. 2 is a modification of the device of FIG. 1.

FIG. 2 shows another embodiment of the vertical and angular position adjusting device of this invention. The component parts in FIG. 2 which are identical or similar in function to the parts of the embodiment in FIG. 1 have like reference numerals preceded by numeral 100. The difference between the embodiment of FIG. 2 and the embodiment of FIG. 1 is particularly in the arrangement of hand lever 128 which is not symmetrically arranged relative to support levers 104 and 106 but is arranged closer to the front support lever 104. For this reason, the rear switching lever 124 is considerably longer than the front switching lever 123. Both switching levers 123 and 124 are pivotably supported on underframe 101 by two separate pivot axles 125 and are held in their locking position by means of projecting arms of a loop spring 126, the loop of the spring encircling the pivot axle 130 of the hand lever 128. The free ends of each arm of the loop spring 126 are bent at right angles and the bent portions engage longitudinal slots in respective switching levers 123 and 124.

Pivot axle 116 of the front arresting lever 114 in this embodiment is arranged above its locking surface 120 so that as soon as the switching finger 122 of switching lever 123 is disengaged from the surface 120, the arresting lever 114 automatically turns by its own weight and disengages its arresting teeth 112 from the gear segment 108 of the front support lever 104. The arms of control cam 129 abut against the assigned cam follower surfaces on switching arm 123 from above and turn the latter downwardly from their normal locking position into their releasing position.

It will be understood that each of the elements described above, or two or more together, may also find a useful application in other types of constructions differing from the types described above.

While the invention has been illustrated and described as embodied in a seat position adjuster of this invention, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a device for adjusting vertical and inclined positions of a vehicle seat, including at each lateral side of the seat a five-bar linkage assembled of an underframe, a seat carrier bar, a pair of support levers pivotably connected to the underframe, a coupling bar linked between one of the support levers and an end portion of the carrier bar, the other end portion of the carrier bar being linked to the other support lever, a combination comprising a gear segment formed on each of said support levers; a pair of arresting levers linked to the underframe and each being provided with arresting teeth engageable with said gear segments; switching levers linked to said underframe between said arresting levers; spring means coupled to said switching levers for urging the same against said arresting levers to bring the arresting teeth thereof into engagement with said gear segments; a control lever pivotably connected to said underframe between said switching levers; and a cam rigidly connected to said control lever and operable to rotate a selected switching lever against the force of said spring means and out of contact with said arresting levers, thus disengaging the arresting teeth from the corresponding gear segment.

2. The combination as defined in claim 1, wherein the side of said arresting levers facing said switching levers is provided with a switching recess defining an upper locking surface and a lower releasing surface, each of said switching levers having an outwardly projecting switching finger normally held in contact with said locking surface, the tip of each switching finger forming with said locking surface a small acute angle.

3. The combination as defined in claim 2, wherein said lower releasing surface extends substantially perpendicularly to said locking surface and said switching fingers being engageable with said switching recesses.

4. The combination as defined in claim 1, wherein said support levers, arresting levers and switching levers in each pair are interchangeable and are mirror-symmetrically arranged relative to a central line, the neutral position of said control lever coinciding with said central line.

5. The combination as defined in claim 4, wherein said switching levers, arresting levers and the support levers are formed by stamping a flat metal sheet.

6. The combination as defined in claim 1, wherein said switching levers are supported on said underframe for rotation about a common pivot axle.

7. The combination as defined in claim 6, wherein said control lever is pivotable above the common axle of said switching levers.

8. The combination as defined in claim 1, wherein the opposite support levers on each lateral side of the vehicle seat are connected for joint rotation by transverse coupling rods, said control levers, said cam, said switching levers and said arresting levers being provided on one lateral side of the seat.

9. The combination as defined in claim 1, wherein said biasing spring is a spiral spring coupled to the tips of said switching levers to hold the latter in the blocking position in abutment against said blocking surfaces of said arresting levers.

* * * * *